(12) United States Patent
Odle et al.

(10) Patent No.: US 6,590,108 B1
(45) Date of Patent: Jul. 8, 2003

(54) METHODS FOR THE PREPARATION OF DIANHYDRIDES

(75) Inventors: Roy Ray Odle, Mt. Vernon, IN (US); Thomas Link Guggenheim, Mt. Vernon, IN (US); William James Swatos, Paducah, KY (US); Michael J. Vollmer, Mt. Vernon, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/065,473

(22) Filed: Oct. 22, 2002

Related U.S. Application Data

(62) Division of application No. 09/683,257, filed on Dec. 5, 2001, now Pat. No. 6,498,224.

(51) Int. Cl.[7] .................. G07D 307/89; G07D 407/02
(52) U.S. Cl. .................................................. 549/241
(58) Field of Search ........................................ 549/241

(56) References Cited

U.S. PATENT DOCUMENTS

| | | | |
|---|---|---|---|
| 1,891,843 A | 12/1932 | Shaw et al. |
| 2,391,226 A | 12/1945 | Clifford et al. |
| 2,764,597 A | 9/1956 | Barney |
| 3,240,792 A | 3/1966 | Patrick et al. |
| 3,346,597 A | 10/1967 | Acetis |
| 3,480,667 A | 11/1969 | Siegart et al. |
| 3,506,689 A | 4/1970 | Gladbeck |
| 3,803,085 A | 4/1974 | Takehoshi et al. |
| 3,819,658 A | 6/1974 | Gormley et al. |
| 3,875,116 A | 4/1975 | Heath et al. |
| 3,879,428 A | 4/1975 | Heath et al. |
| 3,972,902 A | 8/1976 | Heath et al. |
| 3,983,093 A | 9/1976 | Williams, III et al. |
| 4,045,408 A | 8/1977 | Griffith et al. |
| 4,217,281 A | 8/1980 | Markezich et al. |
| 4,257,953 A | 3/1981 | Williams, III et al. |
| 4,273,712 A | 6/1981 | Williams, III |
| 4,302,396 A | 11/1981 | Tsujimoto et al. |
| 4,318,857 A | 3/1982 | Webb et al. |
| 4,329,291 A | 5/1982 | Webb et al. |
| 4,329,292 A | 5/1982 | Webb |
| 4,329,496 A | 5/1982 | Webb |
| 4,340,545 A | 7/1982 | Webb et al. |
| 4,417,044 A | 11/1983 | Parekh |
| 4,455,410 A | 6/1984 | Giles, Jr. |
| 4,514,572 A | 4/1985 | Hamprecht et al. |
| 4,517,372 A | 5/1985 | Tang |
| 4,520,204 A | 5/1985 | Evans |
| 4,559,405 A | 12/1985 | Telschow |
| 4,560,772 A | 12/1985 | Telschow et al. |
| 4,560,773 A | 12/1985 | Telschow |
| 4,571,425 A | 2/1986 | Silva |
| 4,584,388 A | 4/1986 | Webb |
| 4,599,429 A | 7/1986 | Odle |
| 4,612,361 A | 9/1986 | Peters |
| 4,675,376 A | 6/1987 | Peters |
| 4,680,412 A | 7/1987 | Hamprecht et al. |
| 4,902,809 A | 2/1990 | Groeneweg et al. |
| 4,921,970 A | 5/1990 | Odle |
| 4,962,206 A | 10/1990 | Cocoman et al. |
| 4,965,337 A | 10/1990 | Peters et al. |
| 4,978,760 A | 12/1990 | Spohn |
| 5,003,088 A | 3/1991 | Spohn et al. |
| 5,021,588 A | 6/1991 | Contractor |
| 5,049,682 A | 9/1991 | Tang et al. |
| 5,059,697 A | 10/1991 | Fertel et al. |
| 5,132,423 A | 7/1992 | Brunelle et al. |
| 5,155,234 A | 10/1992 | Odle |
| 5,206,391 A | 4/1993 | Seper et al. |
| 5,229,482 A | 7/1993 | Brunelle |
| 5,233,054 A | 8/1993 | Tang et al. |
| 5,235,071 A | 8/1993 | Ueda et al. |
| 5,266,678 A | 11/1993 | Perry et al. |
| 5,300,201 A | 4/1994 | Septer et al. |
| 5,322,954 A | 6/1994 | Seper et al. |
| 5,359,084 A | 10/1994 | Dellacoletta et al. |
| 5,359,092 A | 10/1994 | Hay et al. |
| 5,364,824 A | 11/1994 | Andrews et al. |
| 5,459,227 A | 10/1995 | Hay et al. |
| 5,510,308 A | 4/1996 | Kourtakis |
| 5,536,846 A | 7/1996 | Dellacoletta et al. |
| 5,557,005 A | 9/1996 | Semler et al. |
| 5,672,750 A | 9/1997 | Perry |
| 5,683,553 A | 11/1997 | Baur et al. |
| 5,705,685 A | 1/1998 | Lyons et al. |
| 5,719,295 A | 2/1998 | Dellacoletta et al. |
| 5,750,777 A | 5/1998 | Aubry et al. |
| 5,779,792 A | 7/1998 | Atami et al. |
| 5,792,719 A | 8/1998 | Eberle et al. |
| 5,872,294 A | 2/1999 | Caringi et al. |
| 5,908,915 A | 6/1999 | Brunelle |
| 5,936,099 A | 8/1999 | Dellacoletta et al. |
| 6,008,374 A | 12/1999 | Dellacoletta et al. |
| 6,011,122 A | 1/2000 | Puyenbroek |
| 6,072,010 A | 6/2000 | Puyenbroek |
| 6,235,866 B1 | 5/2001 | Khouri et al. |
| 6,265,521 B1 | 7/2001 | Fyvie et al. |

OTHER PUBLICATIONS

JP 10237063. Publication Date: Sep. 8, 1998. English Abstract.

*Primary Examiner*—Taofiq Solola

(57) ABSTRACT

A method for the synthesis of a dianhydride comprises transimidation of bis (imide) (IV)

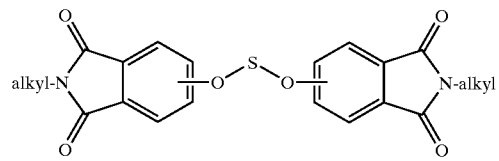

(IV)

in the presence of a substituted phthalic anhydride or 4-substituted tetrahydrophthalic anhydride to yield dianhydride (V)

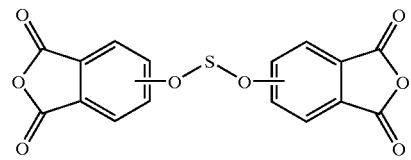

(V)

25 Claims, No Drawings

METHODS FOR THE PREPARATION OF DIANHYDRIDES

CROSS REFERENCE TO RELATED APPLICATIONS

This application is a divisional application of U.S. application Ser. No. 09/683,257 filed on Dec. 5, 2001 now U.S. Pat. No. 6,498,224 which is incorporated by reference herein.

BACKGROUND OF INVENTION

This invention relates to a method for the manufacture of poly(etherimide)s. More particularly, it relates to a method for the preparation of dianhydrides that can facilitate the manufacture of poly(etherimide)s without an intermediate nitration step.

Polyetherimides are high heat engineering plastics having a variety of uses. As disclosed in U.S. Pat. Nos. 4,417,044; 4,599,429; 4,902,809; and 4,921,970, the present commercial process for the synthesis of polyetherimides requires nitration of N-methylphthalimide to yield 4-nitro-N-methylphthalimide. Nitration often results in the formation of byproducts, which must be separated. In the next step of the process, 4-nitro-N-methylphthalimide is treated with the disodium salt of a dihydroxy compound, usually a bis (phenol) such as bisphenol A, to yield a bisimide (I) having the following general structure:

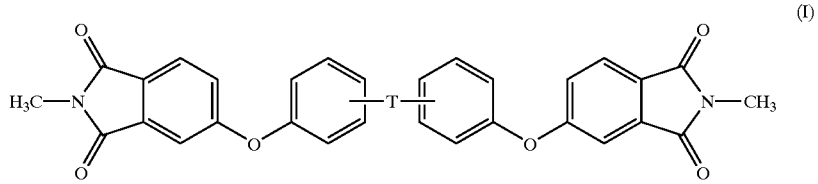

Suitable displacement reactions are disclosed in U.S. Pat. No. 4,257,953. Displacement is also disclosed in U.S. Pat. Nos. 5,132,423 and 5,872,294. Bisimide (I) is then reacted with a phthalic anhydride in an exchange reaction as disclosed in U.S. Pat. Nos. 4,318,857, 4,329,291, 4,329,292, 4,329,496, and 4,340,545 to yield the dianhydride (II):

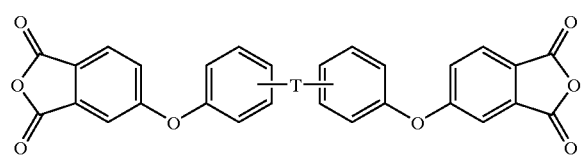

Reaction of dianhydride (II) with a diamine results in polymerization to a poly (etherimide). Methods which improve or even eliminate any of the preceding steps would result in an improved synthesis of poly(etherimide)s.

SUMMARY OF INVENTION

A new method for the synthesis of poly(etherimide)s which eliminates the nitration step comprises synthesis and reaction of a substituted N-alkylphthalimide (III)

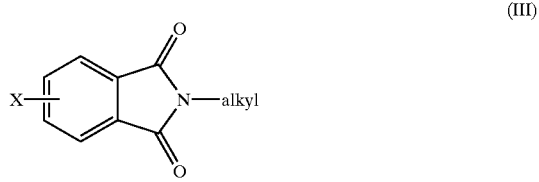

with the disodium salt of a dihydroxy compound such as a bis(phenol) to yield the bis (imide) (IV)

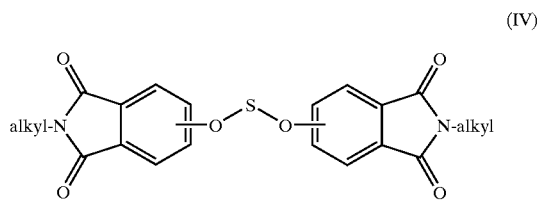

Bis(imide) (IV) is then subjected to transimidation to yield the dianhydride (V)

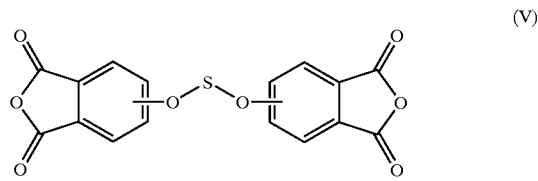

Transimidation is effected in the presence of a substituted phthalic anhydride, which yields a substituted N-alkylphthalimide that corresponds to the substituted phthalic anhydride as a by-product. By-product substituted N-alkylphthalimide may then be recycled for use in the formation bisimide (IV).

In another embodiment, transimidation is effected in the presence of 4-substituted tetrahydrophthalic anhydride, which yields a 4-substituted N-alkyltetrahydrophthalimide as a by-product. The by-product 4-substituted N-alkyltetrahydrophthalimide may be converted by aromatization to a 4-substituted N-alkylphthalimide, which may be used in the formation of bis(imide) (IV).

Finally, the reaction of dianhydride (V) with a diamine (VI) having the structure $$H_2N—R—NH_2 \quad (VI)$$

yields poly(etherimide)s. This route obviates the need for the intermediate nitration step required by the prior art synthesis.

DETAILED DESCRIPTION

A convenient route for the manufacture of poly (etherimide)s comprises synthesis and reaction of a substituted N-alkylphthalimide (III):

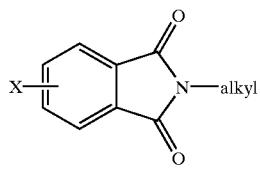
(III)

wherein the alkyl group is a branched or straight chain alkyl group having from one to about 18 carbons. Preferably, the alkyl group is a methyl group. The substituent (X) is a nitro, chloro, bromo, or fluoro in the 3- or 4- position. Substituted N-alkylphthalimides may be obtained by the treatment of the corresponding substituted phthalic anhydride with a primary amine having the formula $H_2N$-alkyl via a melt reaction, for example by contact of a gaseous primary amine such as methylamine with molten 4-halophthalic anhydride. Halophthalic anhydrides may be obtained by aromatization of the corresponding halotetrahydrophthalic anhydrides as disclosed in U.S. Pat. Nos. 5,233,054, 5,003,088, 5,059,697 and 4,978,760. Halophthalic anhydrides may also be obtained by the aromatization of the corresponding halotetrahydophthalic anhydrides in the presence of a catalyst such as a transition metal oxide. Nitro substituted phthalic anhydrides may be obtained by the nitration of phthalic anhydrides as taught in U.S. Pat. No. 5,155,234.

Displacement of the substituent of the substituted N-alkylphthalimide (III) may be effected by treatment with the disodium salt of a dihydroxy compound having the formula (VII)

$$HO—S—OH \quad (VII)$$

to yield the bis(imide) (IV)

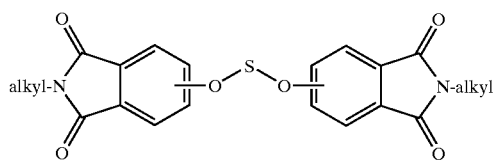
(IV)

wherein S is a divalent radical, for example a straight or branched chain alkylene group having from about 2 to about 20 carbon atoms; a cycloalkylene group having from about 3 to about 20 carbon atoms; or an arylene group having from 6 to about 20 carbon atoms, and halogenated derivatives thereof. The alkylene, cycloalkylene, and arylene groups may be further substituted with alkyl, halogenated alkyl, fluoro, alkoxy, nitro, phenyl, phenoxy, aryl or other groups, provided that such substitutions do not interfere with synthesis or reaction. The displacement reaction between the dihydroxy compound and the substituted N-alkylphthalimide may be conducted in an inert solvent such as toluene, xylene, chlorobenzene or dichlorobenzene in the presence of a phase transfer catalyst such as hexaethylguanidinium chloride at a temperature in the range of about 110 to about 180° C. as taught in U.S. Pat. No. 5,132,423, which is incorporated by reference herein. Displacement may also occur in the melt phase with the substituted N-alkyphthalimide.

A particularly preferred dihydroxy compound is bis (phenol) (VIII)

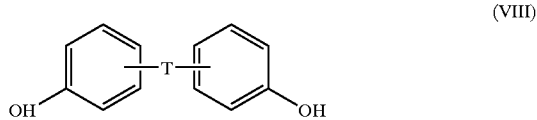
(VIII)

wherein T is a single bond linking the two aryl groups, or a divalent radical, for example a straight or branched chain alkylene group having from one to about 20 carbon atoms; a cycloalkylene group having from about 3 to about 20 carbon atoms; or an arylene group having from 6 to about 20 carbon atoms, and halogenated derivatives thereof. The alkylene, cycloalkylene, and arylene groups may be further substituted alkyl, halogenated alkyl, fluoro, alkoxy, nitro, phenyl, phenoxy, aryl or other groups, provided that such substitutions do not interfere with synthesis or reaction. T further includes divalent functional groups such as sulfide, carbonyl, sulfoxide, and ether and divalent radicals of formula (XV)

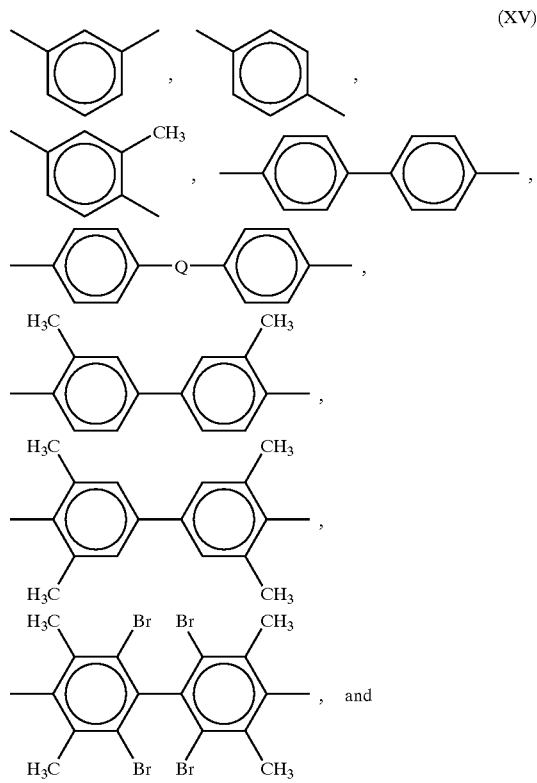
(XV)

-continued

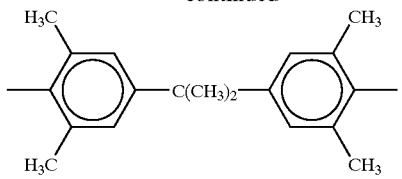

Illustrative examples of bis(phenol)s of formula (VIII) include 2,2-bis[4-hydroxyphenyl]propane; 4,4'-bis(4-hydroxyphenyl)diphenyl ether; 4,4'-bis(4-phenoxy)diphenyl sulfide; 4,4'-bis(4-hydroxyphenyl)benzophenone; 4,4'-bis(4-hydroxyphenyl)diphenyl sulfone; 2,2-bis[4-(3-hydroxyphenyl)phenyl]propane; 4,4'-bis(3-hydroxyphenyl) diphenyl ether; 4,4'-bis(3-hydroxyphenyl)diphenyl sulfide; 4,4'-bis(3-hydroxyphenyl)benzophenone; 4,4'-bis(3-hydroxyphenyl)diphenyl sulfone; 4-(3-hydroxyphenyl)-4'-(4-hydroxyphenyl)diphenyl-2,2-propane; 4-(3-hydroxyphenyl)-4'-(4-hydroxyphenyl)diphenyl ether; 4-(3-hydroxyphenyl)-4'-(4-hydroxyphenyl)diphenyl sulfide; 4-(3-hydroxyphenyl)-4'-(4-hydroxyphenyl) benzophenone, and 4-(hydroxyphenyl)-4'-(4-hydroxyphenyl)diphenyl sulfone dianhydride, as well as various mixtures thereof. These and other bis(phenol)s and dihydroxy compounds are described in U.S. Pat. Nos. 3,972,902 and 4,455,410.

Bis(imide) (IV) is treated with a substituted phthalic anhydride (IX)

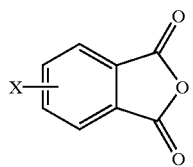

via transimidation to yield dianhydride (V)

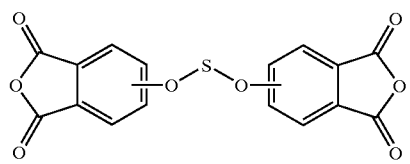

wherein S is as described above. Useful substituted phthalic anhydrides have a nitro, chloro, bromo, or fluoro group in the 3 or 4 position although chloro and bromo substituents are preferred. Also preferred are mixtures of structural isomers, for example a mixture comprising 3-halophthalic anhydride and 4-halophthalic anhydride. Surprisingly, reaction conditions may be adjusted so as to minimize the formation of the N-alkylamino-N-alkylphthalimide (from the displacement of the halo group with alkylamine), a highly colored by-product which can impart an undesirable color to the product dianhydride. Preferably, the YI of the product is less than about 25, and more preferably less than about 15 as measured by the UV spectrum of the product.

A desired by-product of this reaction is substituted N-alkylphthalimide (III), which may be isolated and used for reaction with a dihydroxy compound (VII) as described above.

In an alternative embodiment, transimidization of bis (imide) (IV) is effected in the presence of 4-substituted tetrahydrophthalic anhydride (X)

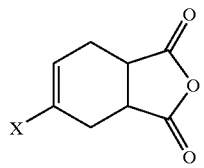

Useful substituents are nitro, chloro, fluoro and bromo. Chloro and bromo substituents are preferred. 4-substituted tetrahydrophthalic anhydride (X) is available from the Diels-Alder condensation of the dienophile maleic anhydride with the 2-substituted-1,3-butadiene. Conditions for this reaction are known in the chemical literature.

The by-product of this transimidization is a 4-substituted N-alkyltetrahydrophthalimide (XI)

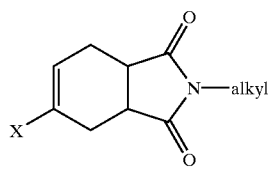

4-substituted N-alkyltetrahydrophthalimide (XI) may be converted by aromatization to 4-substituted N-alkylphthalimide, which can be used in the displacement reaction with the dihydroxy compound as described above. Aromatization may be achieved by any method known in the art such as those taught by U.S. Pat. Nos. 5,233,054, 5,003,088, 5,059,697, and 4,978,760. Alternately, aromatization can be achieved in the presence of a transition metal oxide catalyst such as vanadium oxide;($V_2O_5$) at a temperature in the range of about 250° C. to about 270° C.

Transimidization with either substituted phthalic anhydrides (IX) or 4-substituted tetrahydrophthalic anhydride (X) may be conducted in an inert solvent such as water in the presence of a base such as triethylamine at a temperature in the range from about 150 to about 250° C., and preferably in the range from about 160 to about 180° C. For example, transimidation is effected by reaction of bis(imide) (IV) with a 6–7 fold molar excess of substituted phthalic anhydride (IX) or 4-substituted tetrahydrophthalic anhydride (X) in water in the presence of at least one mole of base, e.g., triethylamine, per mole of anhydride at about 170° C. for about one to about 1 to 2 hours.

Preferably, the aqueous reaction mixture is then continuously extracted in a packed column with an organic solvent, e.g., toluene, containing a base such as triethylamine to remove unconverted bis(imide) (IV) and the formed substituted N-alkylphthalimide (III) or 4-substituted N-alkyltetrahydrophthalimide (XI). Transimidation may continue within the column. The aqueous eluent from the column contains the tetraacid of dianhydride (V) and substituted phthalic diacid, both present as base conjugated salts. The aqueous solution is fed to a flash distillation vessel whereby a majority of the water and some of the base is removed. The bottoms from this vessel are fed to a wiped film evaporator under vacuum, where the base conjugated salts crack to liberate base with concomitant ring closure of diacids and tetraacids to anhydride and dianhydride. Water, base, and substituted phthalic anhydride or 4-substituted tetrahydrophthalic anhydride are taken overhead. The dianhydride is isolated as a molten liquid from the bottom of the wiped film evaporator. The base, water, and the substituted phthalic anhydride or 4-substituted tetrahydrophthalic anhydride from the flash vessel and from the wiped film evaporator are recycled back to the exchange reactor.

Preferably, the organic eluent from the extraction process is fed to a flash vessel wherein the solvent and the base are removed from the heavier organics. These overheads are recycled back to the bottom of the exchange column. The bottom from this flash vessel is fed to another flash vessel where substituted N-alkylphthalimide, when present, (or 4-substituted N-alkyltetrahydrophthalimide) is (III) taken over head. Substituted N-alkylphthalimide may then be purified before being reused in the displacement reaction. When 4-substituted N-alkyltetrahydrophthalimide is present it must first be converted by aromatization to 4-substituted N-alkyl phthalimide then used in the displacement reaction. The bottom of the flash vessel primarily contains primarily recycled bis(imide) (IV), imide-anhydride (bisimide wherein only one of the imides has been converted to an anhydride), and some substituted N-alkylphthalimide (III) or 4-substituted N-alkyl phthalimide. These may be cycled back to the exchange reactor.

Dianhydride (V) may then be reacted with diamine (VI) to yield poly(etherimide)s. Diamine (VI) has the structure

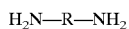

(VI)

wherein R in formula (VI) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (XII)

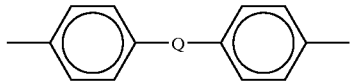

(XII)

wherein Q includes but is not limited to divalent a divalent moiety selected from the group consisting of —O—, —S—, —C(O)—, —SO$_2$—, C$_y$H$_{2k}$— (y being an integer from 1 to 5), and halogenated derivatives thereof, including perfluoroalkylene groups.

Any diamino compound may be employed. Examples of suitable compounds are ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis (p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) sulfide, bis(4-aminophenyl) sulfone, bis(4-aminophenyl) ether and 1,3-bis(3-aminopropyl) tetramethyldisiloxane. Mixtures of these compounds may also be present. The preferred diamino compounds are aromatic diamines, especially m- and p-phenylenediamine and mixtures thereof.

All patents cited herein are incorporated by reference.

The invention is further described by the following non-limiting examples:

EXAMPLES

Batch transimidation (exchange) reactions were conducted in a Parr apparatus of 600 mL capacity with two quartz oblong windows on the opposite sides of the vessel, equipped with a glass liner, a water cooled magnetic drive device (modified such that all internal bearing surfaces were Teflon) which was speed controlled and a heating mantle controlled by a temperature controller. A thermocouple was fitted to one of the ports on the reactor head, another port was fitted with a 680 psi rupture disc (rated at 170° C.), and another port was fitted with a dip tube (⅛ inch 316 stainless steel) running to the bottom of the reactor. The dip tube port was used for the aqueous phase manipulation, introduction of the organic phase to the reactor, and for maintaining pressure during the extraction procedure. A zero volume coupling was connected to a nitrogen line equipped with a pressure indicator, a 580 psi relief spring valve, and appropriate needle valves for purging and placing the reactor under an inert atmosphere, e.g., nitrogen.

A second, 2-liter Parr apparatus, equipped with a magnetic, water-cooled agitator, a thermocouple, and a dip tube was used for pre-mixing the anhydride, triethylamine, and water. The line from the 2-liter Parr to the 600 mL Parr was ¼ inch 316 stainless wrapped with electrical heat tape and insulated. The temperature of the vessel was controlled at 190° C.

A typical experimental procedure is as follows. Finely ground bis(imide) (XIII)

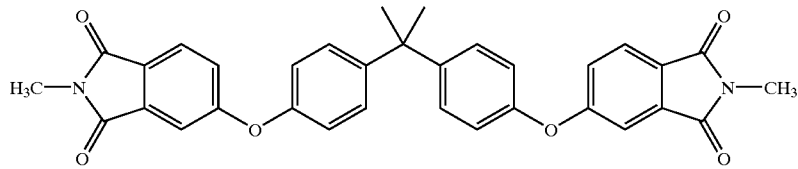

(XIII)

(typically 25.7 g) was charged to the 600 mL Parr, and after replacing the atmosphere with nitrogen, the temperature of the Parr was raised to 170° C. The contents of the vessel were isolated with needle valves and agitated. The second, 2-liter Parr was charged with an aqueous mixture of phthalic anhydride or 4-chlorophthalic anhydride, triethylamine (TEA) and water, and any additional anhydride (typically 320 grams of aqueous solution comprising 19.8% anhydride, 17.9% triethylamine, balance water, 5.5 grams of additional anhydride). The water was degassed with nitrogen or helium prior to the addition of 4-chlorophthalic anhydride, which was followed by the addition of triethylamine. The contents of this vessel were isolated using the needle valves, placed under an inert atmosphere and then heated to 180° C. Pressure typically rose to 190 psi.

The contents of the 2-liter Parr were then transferred to the 600 mL Parr with nitrogen pressure, except for about 14 g, which remained in the second Parr. The contents of 600 mL Parr were maintained at 170° C. The reaction mixture went clear within 22 minutes. Approximately 2-mL samples of the reaction mixture were taken through a long dip tube while maintaining an inert atmosphere. The dip tube temperature was also maintained at about 180° C. The cooled samples were analyzed by infrared spectroscopy to determine the percent exchange.

Example 1
Batch Transimidation with 4-Chlorophthalic Anhydride

4-Chlorophthalic anhydride was reacted as described above on a laboratory scale with bis(imide) (XIII) in water and in the presence of TEA, in which the molar ratio of 4-chlorophthalic anhydride:triethylamine:bis(imide) was 7.7:11.55:1 at 7.3% solids. About 70% exchange occurred in one hour at 170° C. to ultimately yield product dianhydride (XIV)

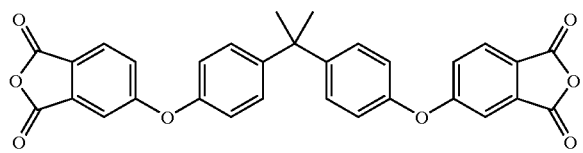

(XIV)

Percent solids are defined as the weight of BPA bis(imide) (XIII) divided by the total weight of solution.

Example 2
Optimization of Transimidation Using 4-Chlorophthalic Anhydride

A series of batch laboratory exchange reactions were performed in order to define optimal operating parameters for transimidation using 4-chlorophthalic anhydride (CIPA), and in particular to determine the reaction rate and molar ratio of 4-chlorophthalic anhydride:bis(imide) (XIII) (BI) required to achieve 65–70% exchange. Formulations are shown in Table 1, and results are shown in Table 2.

TABLE 1

| No. | Final CIPA:BI Molar Ratio | Final TEA:CIPA Molar Ratio | CIPA:TEA:BI Molar Ratio | | | % Solids |
|---|---|---|---|---|---|---|
| 1 | 5.2:1 | 1.0:1 | 5.2 | 5.1 | 1.0 | 14.2 |
| 3 | 6.3:1 | 1.0:1 | 6.3 | 6.0 | 1.0 | 12.3 |
| 5 | 5.7:1 | 1.5:1 | 5.7 | 8.6 | 1.0 | 10.0 |
| 10 | 7.7:1 | 1.5:1 | 7.7 | 11.5 | 1.0 | 7.6 |
| 12 | 8.6:1 | 1.5:1 | 8.6 | 12.9 | 1.0 | 6.9 |

TABLE 2

| Example Number | Percent Exchange at Time (Minutes) (as determined by IR) | | | | | | | | | | | | | |
|---|---|---|---|---|---|---|---|---|---|---|---|---|---|---|
| | 20 | 25 | 30 | 40 | 50 | 60 | 70 | 80 | 90 | 100 | 110 | 120 | 150 | 160 |
| 1 | 1.0 | 3.3 | 7.6 | 15.8 | 24.9 | 33.5 | 40.3 | 45.2 | 49.6 | 53.3 | 54.4 | 56.0 | ns* | ns |
| 3 | 6.6 | 13.5 | 16.2 | 24.1 | 31.3 | 39.2 | 43.8 | 49.1 | 51.7 | 54.8 | 56.0 | 59.1 | 62.7 | ns |
| 5 | 37.7 | 53.0 | 58.3 | 61.7 | 62.5 | 62.8 | 62.4 | 63.0 | 62.7 | 62.7 | 62.6 | 62.7 | ns | ns |
| 10 | 51.1 | 62.0 | 66.7 | 62.2 | 68.9 | 67.1 | 68.9 | 69.2 | 69.1 | 69.4 | 69.2 | 69.6 | ns | 69.7 |
| 12 | 60.9 | 68.5 | 70.5 | 70.7 | 71.6 | 71.6 | 71.0 | 71.6 | 71.6 | 71.4 | 71.3 | 71.2 | ns | 71.4 |

*not sampled

As the above data show, a molar ratio of about 6:1 of anhydride to bis(imide) was required to achieve 62.8% exchange in one hour, and a molar ratio of 7.67:1 is required to achieve 69.5% exchange in 70 minutes.

Example 3
Transimidation/Extraction

Transimidation reactions followed by continuous extraction to isolate the product dianhydride were conducted in an apparatus similar to that used for batch transimidation, except that the dip tube protruded into the reactor only about one-third of the way, and the reactor was further fitted with a ⅛-inch 316 stainless steel tube extending to the bottom of the reactor. This tube was connected to a high pressure liquid chromatography (HPLC) system capable of delivering 40 mL per minute via of ½-inch 316 stainless steel tubing wrapped with electrical heating tape. This allowed delivery of the toluene/triethylamine extraction solution to the bottom of the reactor, while the organic phase exited through the dip tube, which had a needle valve plumbed to an external cooling bath, and then to a collection vessel. A recirculation loop on the toluene feed line was used to purge oxygen from the toluene feed equipment.

In a typical procedure, the reactor was charged with the reactants as described above, (typically 17.0 g of bis(imide) (XIII) (BI) and 9.0 g of anhydride (4-chlorophthalic anhydride unless otherwise indicated) in 100 g of an aqueous solution comprising 18 wt. % triethylamine, 16.5 wt. % anhydride, with the balance being water), yielding a final molar ratio of TEA:anhydride of about 1.1:1.

After reaction was completed, agitation was decreased to 10%, and about 1 liter of solution comprising about 2–3 wt. % triethylamine in toluene sparged with nitrogen was pumped into the Parr reactor at 20 ml/minute at 160–170° C.

The toluene phase exited the reactor through the dip pipe. The exit flow rate was controlled by a needle valve on the exit line. The exit flow rate was made to match the feed rate of the toluene/TEA solution. Extraction was allowed to proceed for about 1 hour. After extraction, agitation was decreased and the contents of the reactor were cooled to about 85° C. The contents of the reactor were then transferred under an inert atmosphere to a 500-mL flask equipped with a bottom drain, and the phases were allowed to separate.

A portion of the aqueous phase (typically 17 to 25 mL) was then devolatized by charging to a clean 250-mL one-necked round-bottomed flask which was maintained under an inert atmosphere. The flask was placed in a GC oven and attached to a glass dual bulb Kugelrohr type extension on the outside of the oven using a glass extension piece. The dual bulb was cooled with an external dry ice/methylene chloride bath and attached to a Kugelrohr oscillating drive which was itself connected to a direct drive vacuum pump protected by a dry ice trap.

The flask was placed slowly under full vacuum (generally 0.1 mm Hg or less) and the GC oven temperature program was slowly heated to 240° C. The total time in the oven was about one hour. The oven door was opened at the conclusion of the temperature program and the flask was allowed to air cool. Solidified dianhydride was removed from the flask and analyzed by IR spectroscopy to determine the percent exchange and the composition, respectively. Yellowness Index was determined by ASTM D1925.

Formulations and results are shown in Table 3 below.

4-chlorotetrahydrophthalic anhydride:triethylamine:bisimide was 8:9.63:1. The vessel atmosphere was replaced with nitrogen, pressurized with 30 psi of nitrogen and then heated to 170° C. The reaction continued at 170° C. for 2.3 hours with agitation. The reaction mixture was cooled to 80° C. and the reactor was vented. A sample of the aqueous phase was removed from the reaction vessel and heated at 350° C. on a hot plate for 10 minutes to remove 4-chlorotetrahydrophthalic anhydride, the N-methyl imide of 4-chlorotetrahydrophthalic anhydride, water and triethylamine. Infrared spectroscopy of the residue showed that approximately 75% exchange had occurred.

The remaining reaction mixture was transferred to a separatory funnel and extracted once with 500 ml of toluene containing 30 ml of triethylamine at 80° C. A portion of the extracted aqueous phase was heated at 350° C. on a hot plate for 10 minutes to remove 4-chlorotetrahydrophthalic anhydride, the N-methyl imide of 4-chlorotetrahydrophthalic anhydride, water and triethylamine. Infrared spectroscopy of the extracted aqueous phase residue showed that approximately 86% exchange had occurred.

As can be seen by the preceding examples transimidation of a bisimide (IV) with either a substituted phthalic anhydride or a 4-subsituted tetrahydrophthalic anhydride provides a convenient, cost effective, and efficient route to poly(etherimide)s and eliminates the nitration step required in previous poly(etherimide) syntheses.

Additionally, transimidation can result in dianhydrides with a YI of less than about 25.

TABLE 3

| No. | Anhydride:BI Molar Ratio | TEA:Anhydride Molar Ratio | Anhydride:TEA:BI Molar Ratio | | | % Solids | Yield** | YI |
|---|---|---|---|---|---|---|---|---|
| 14 | 6.0:1 | 1.5:1 | 6.0 | 9.0 | 1.0 | 9.6 | 90.6 | 39.0 |
| 16 | 6.0:1 | 1.1:1 | 6.0 | 6.6 | 1.0 | 11.8 | 95.3 | 15.4 |
| 18 | 6.0:1 | 1.5:1 | 6.0 | 9.0 | 1.0 | 9.6 | 94.0 | 39.0 |
| 72* | 5.0:1 | 1.1:1 | 5.0 | 5.5 | 1.0 | 14.5 | 96.7 | 12.0 |
| 75* | 5.0:1 | 1.1:1 | 5.0 | 5.5 | 1.0 | 14.5 | 95.9 | 12.0 |
| 78* | 5.0:1 | 1.1:1 | 5.0 | 5.5 | 1.0 | 14.5 | 95.0 | 10.4 |
| 80* | 5.0:1 | 1.1:1 | 5.0 | 5.5 | 1.0 | 14.5 | 96.1 | 8.0 |
| 83 | 5.0:1 | 1.1:1 | 5.0 | 5.5 | 1.0 | 14.5 | 94.6 | 7.0 |

*Control using phthalic anhydride
**Percent Exchange on final product after completion of extraction Further analysis indicated that product dianhydride (XIV) having low color (YI 15.4) was isolated from a batch exchange reaction run at a 6:1 molar ratio of anhydride:bis(imide) (XIII) at 170° C., using a molar ratio of 1.1:1 triethylamine:anhydride for one hour, followed by toluene extraction and laboratory dianhydride isolation. Product dianhydride (XIV) having even lower color (YI 7) was isolated from a batch exchange reaction run at a 5:1 molar ratio of anhydride:bis(imide) (XIII), with a molar ratio of 1.1:1 triethylamine:anhydride and using 14.46% solids in the exchange reaction for 1 hour at 170° C., followed by 2% triethylamine in toluene extraction. Extent of exchange was about 52%. Conventional laboratory transimidation using phthalic anhydride and bis(imide) (XIII) yield product dianhydrides with a YI of 8 to 12.

Example 4
Transimidation with 4-halotetrahydrophthalic Anhydride

A Parr apparatus was charged with 100 mL of water, 12.0 g of bisimide (XIII), 32.8 g of 4-chlorotetrahydrophthalic anhydride, and 21.4 g of triethylamine. The molar ratio of Example 5
Conversion of 4-chloro-N-methyl-tetrahydrophthalimide to 4-chloro-N-methyl-phthalimide Gas phase reactions were carried out in a hot-tube reactor that was packed with about 13 grams of a catalyst containing $V_2O_5$. The inlet of the hot-tube reactor was connected to a flow controller and heated syringe pump. The flow controller managed the flow of purified air. The heated syringe pump contained 4-chloro-N-methyl tetrahydrophthalimide and delivered it to the hot tube reactor at a constant rate of 0.05 milliliters per minute. The outlet of the hot tube reactor was connected to a receiver cooled in an ice-bath where the reaction products were collected. The hot-tube reactor was maintained at the 260° C. The reaction product was analyzed by gas chromatographic techniques after the system had equilibrated for 10–20 minutes. At a flow rate of 90 ml/min all of the N-methyl-4-chlorotetrahydrophthalimide was converted to N-methyl-4-chlorophthalimide.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for the synthesis of a dianhydride, comprising transimidation of a bis(imide) (IV)

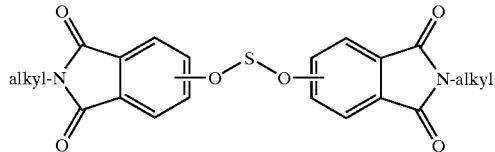

(IV)

wherein the alkyl is moiety is a straight or branched chain alkyl group having from 1 to about 18 carbon atoms, and S is a divalent radical selected from the group consisting of a straight or branched chain alkylene group having from about 2 to about 20 carbon atoms, a cycloalkylene group having from about 3 to about 20 carbon atoms, and an arylene group having from 6 to about 20 carbon atoms in the presence of a substituted phthalic anhydride having a substituent selected from the group consisting of nitro, bromo, fluoro and chloro, to yield a dianhydride (V)

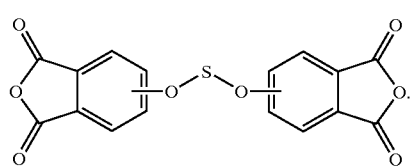

(V)

2. The method of claim 1, wherein the transimidation in the presence of the substituted phthalic anhydride yields a substituted N-alkylphthalimide.

3. The method of claim 2 wherein the substituted N-alkylphthalimide is recycled for use in the formation of bisimide (IV).

4. The method of claim 1 wherein the substituted phthalic anhydride is a mixture of 3-substituted phthalic anhydride and 4-substituted phthalic anhydride.

5. The method of claim 4 wherein the 3-substituted phthalic anhydride is 3-chlorophthalic anhydride and the 4-substituted phthalic anhydride is 4-chlorophthalic anhydride.

6. The method of claim 5, wherein transimidation yields a mixture of 3-substituted N-alkylphthalimide and 4-substituted N-alkylphthalimide.

7. The method of claim 6 wherein the mixture of 3-substituted N-alkylphthalimide and 4-substituted N-alkylphthalimide is recycled for use in the formation of bisimide (IV).

8. The method of claim 1 wherein the substituted phthalic anhydride is 4-chlorophthalic anhydride.

9. The method of claim 8 wherein the transimidation yields N-alkyl-4-chlorophthalimide.

10. The method of claim 9 wherein the N-alkyl-4-chlorophthalimide is recycled for use in the formation of bisimide (IV).

11. The method of claim 1, wherein the YI of the product dianhydride is less than about 25.

12. The method of claim 1, wherein the alkyl moiety is methyl.

13. The method of claim 1, wherein S is derived from bisphenols having the formula (VIII)

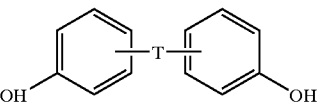

(VIII)

wherein T is a single bond linking the two aryl groups, a divalent straight or branched chain alkylene radical having from one to about 20 carbon atoms, a divalent cycloalkylene group having from about 3 to about 20 carbon atoms, a divalent arylene group having from 6 to about 20 carbon atoms, a divalent sulfide, a divalent carbonyl, a divalent sulfoxide, a divalent radical of formula (XV)

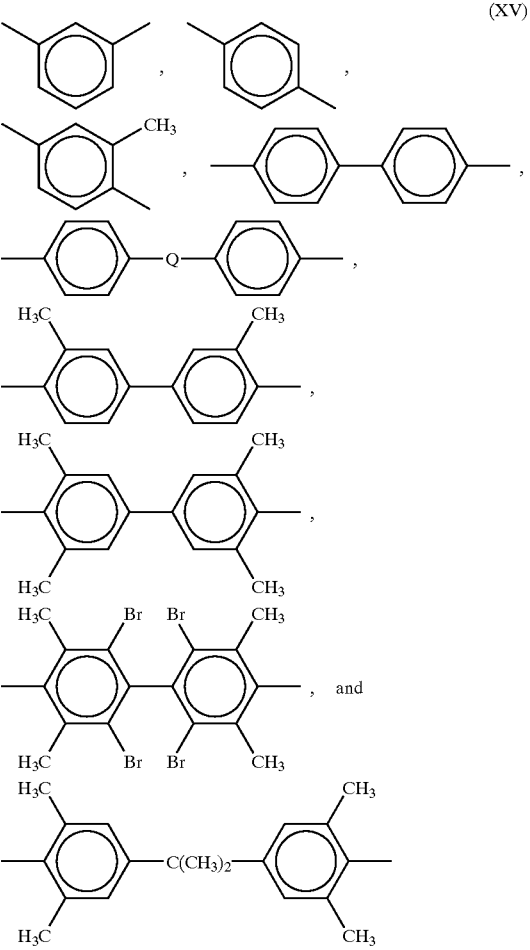

(XV)

or a mixture thereof.

14. The method of claim 13, wherein the bis(phenol) is selected from the group consisting of 2,2-bis[4-hydroxyphenyl]propane; 4,4'-bis(4-hydroxyphenyl) diphenyl ether; 4,4'-bis(4-phenoxy)diphenyl sulfide; 4,4'-bis(4-hydroxyphenyl) benzophenone; 4,4'-bis(4-hydroxyphenyl) diphenyl sulfone; 2,2-bis[4-(3-hydroxyphenyl)phenyl] propane; 4,4'-bis(3-hydroxyphenyl)diphenyl ether; 4,4'-bis(3-hydroxyphenyl)diphenyl sulfide; 4,4'-bis(3-hydroxyphenyl) benzophenone; 4,4'-bis(3-hydroxyphenyl) diphenyl sulfone; 4-(3-hydroxyphenyl)-4'-(4-hydroxyphenyl)diphenyl-2,2-propane; 4-(3-hydroxyphenyl)-4'-(4-hydroxyphenyl)diphenyl ether; 4-(3-hydroxyphenyl)-4'-(4-hydroxyphenyl)diphenyl sulfide; 4-(3-hydroxyphenyl)-4'-(4-hydroxyphenyl) benzophenone, 4-(hydroxyphenyl)-4'-(4-hydroxyphenyl)diphenyl sulfone dianhydride, and mixtures thereof.

15. A method for the synthesis of a dianhydride, comprising transimidation of a bis(imide) (IV)

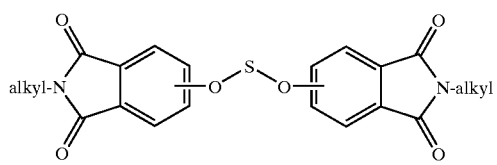

(IV)

wherein the alkyl is moiety is a straight or branched chain alkyl group having from 1 to about 18 carbon atoms, and S is a divalent radical selected from the group consisting of a straight or branched chain alkylene group having from about 2 to about 20 carbon atoms, a cycloalkylene group having from about 3 to about 20 carbon atoms, an arylene group having from 6 to about 20 carbon atoms in the presence of a 4-substituted tetrahydrophthalic anhydride having a substituent selected from the group consisting of chloro, bromo, fluoro, and nitro, to yield a dianhydride (V)

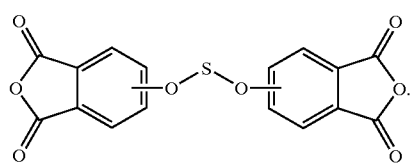

(V)

16. The method of claim 15, wherein the transimidation in the presence of the 4-substituted tetrahydrophthalic anhydride yields a 4-substituted N-alkyltetrahydrophthalimide.

17. The method of claim 16 wherein the 4-substituted N-alkyltetrahydrophthalimide is converted to the 4-substituted N-alkyl phthalimide for use in the formation of bisimide (IV).

18. The method of claim 16 wherein the 4-substituted N-alkyltetrahydrophthalimide is converted to the 4-substituted N-alkyl phthalimide in the presence of vanadium oxide.

19. The method of claim 15 wherein the 4-substituted tetrahydrophthalic anhydride is 4-chlorotetrahydrophthalic anhydride.

20. The method of claim 19 wherein the transimidation yields N-alkyl-4-chlorotetrahydrophthalimide.

21. The method of claim 20 wherein the N-alkyl-4-chlorotetrahydrophthalimide is converted to 4-chloro N-alkyl phthalimide for use in the formation of bisimide (IV).

22. The method of claim 15 wherein the alkyl moiety is methyl.

23. The method of claim 15, wherein S is derived from bisphenols having the formula (VIII)

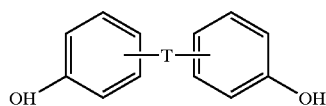

(VIII)

wherein T is a single bond linking the two aryl groups, a divalent straight or branched chain alkylene radical having from one to about 20 carbon atoms; a divalent cycloalkylene group having from about 3 to about 20 carbon atoms, a divalent arylene group having from 6 to about 20 carbon atoms, a divalent sulfide, a divalent carbonyl, a divalent sulfoxide, a divalent radical of formula (XV)

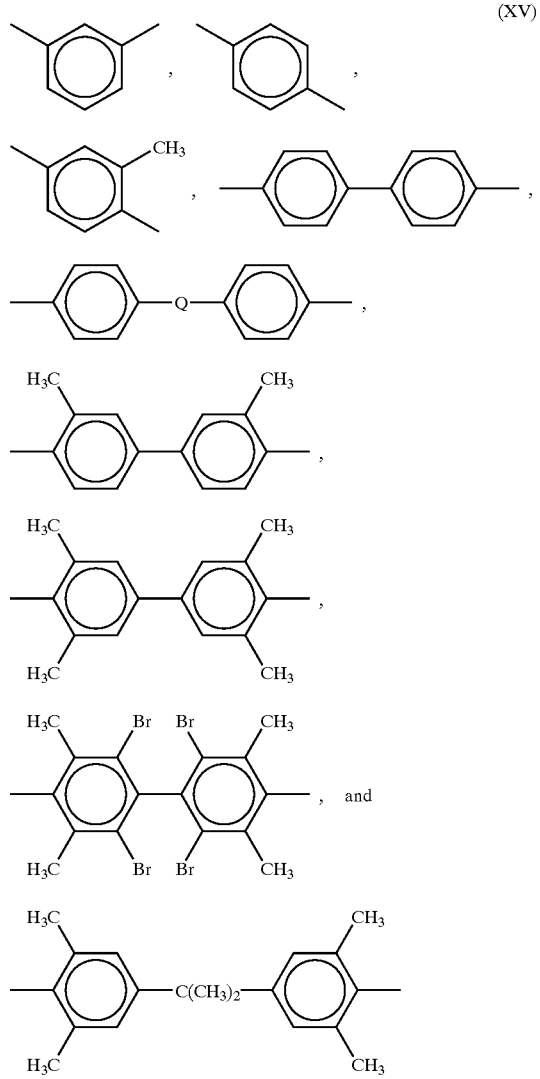

(XV)

or a mixture thereof.

24. The method of claim 23, wherein the bis(phenol) is selected from the group consisting of 2,2-bis[4-hydroxyphenyl]propane; 4,4'-bis(4-hydroxyphenyl) diphenyl ether; 4,4'-bis(4-phenoxy)diphenyl sulfide; 4,4'-bis(4-hydroxyphenyl) benzophenone; 4,4'-bis(4-hydroxyphenyl) diphenyl sulfone; 2,2-bis[4-(3-hydroxyphenyl)phenyl] propane; 4,4'-bis(3-hydroxyphenyl)diphenyl ether; 4,4'-bis (3-hydroxyphenyl)diphenyl sulfide; 4,4'-bis(3-hydroxyphenyl) benzophenone; 4,4'-bis(3-hydroxyphenyl) diphenyl sulfone; 4-(3-hydroxyphenyl)-4'-(4-hydroxyphenyl)diphenyl-2,2-propane; 4-(3-hydroxyphenyl)-4'-(4-hydroxyphenyl)diphenyl ether; 4-(3-hydroxyphenyl)-4'-(4-hydroxyphenyl)diphenyl sulfide; 4-(3-hydroxyphenyl)-4'-(4-hydroxyphenyl) benzophenone, 4-(hydroxyphenyl)-4'-(4-hydroxyphenyl)diphenyl sulfone dianhydride, and mixtures thereof.

25. A method for the synthesis of a dianhydride, comprising transimidation of a bis(imide) (XIII)

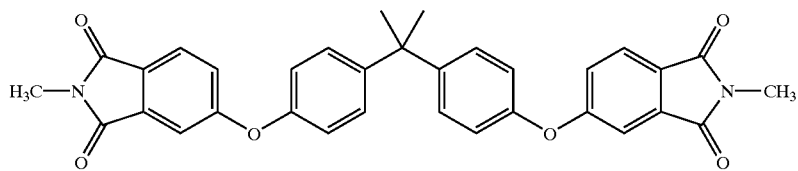
(XIII)
in the presence of a 4-substituted tetrahydrophthalic anhydride or a substituted phthalic anhydride having a substituent selected from the group consisting of chloro, bromo, fluoro, and nitro, to yield a dianhydride (XIV)
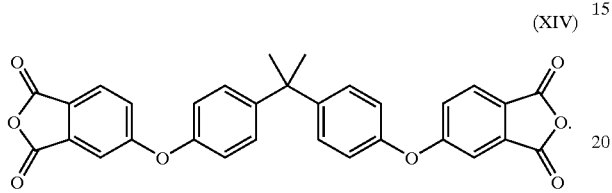
(XIV)
\* \* \* \* \*